June 20, 1933.  F. H. HEHEMANN  1,914,719
LOOSE STEM ROTOR AND LUBRICATED VALVE
Filed June 23, 1930  4 Sheets-Sheet 1
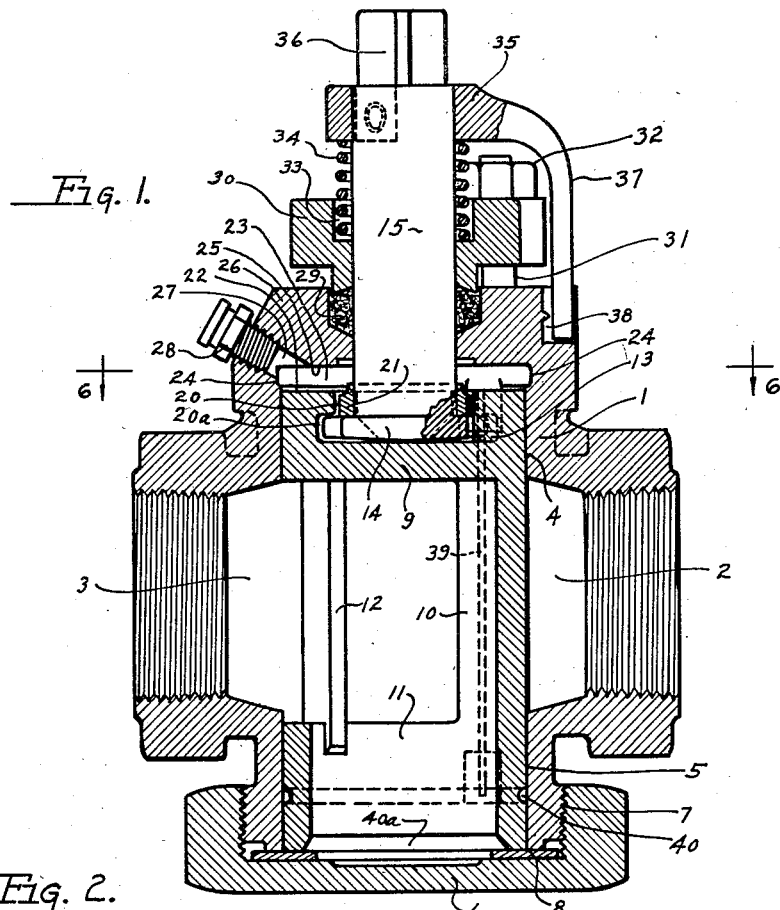
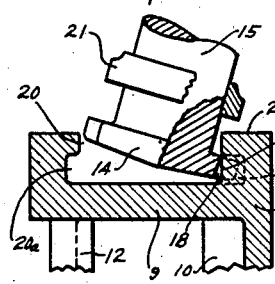
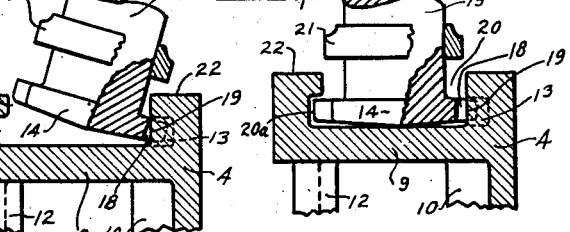
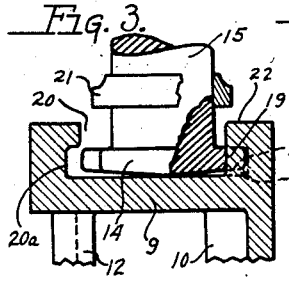
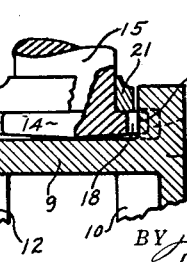
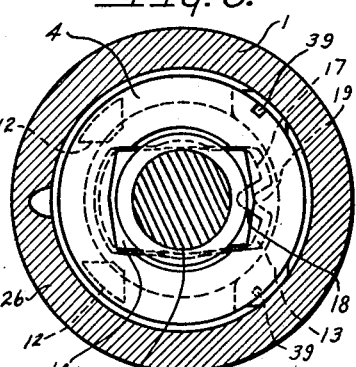
INVENTOR
Frederick H. Hehemann
BY
Toulmin & Toulmin
ATTORNEY

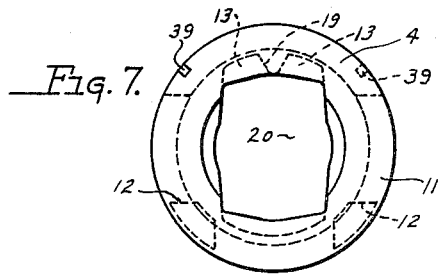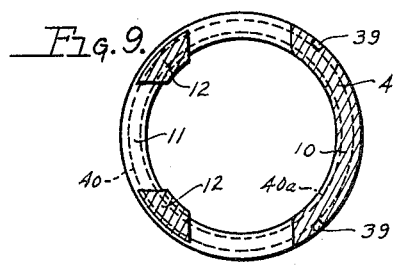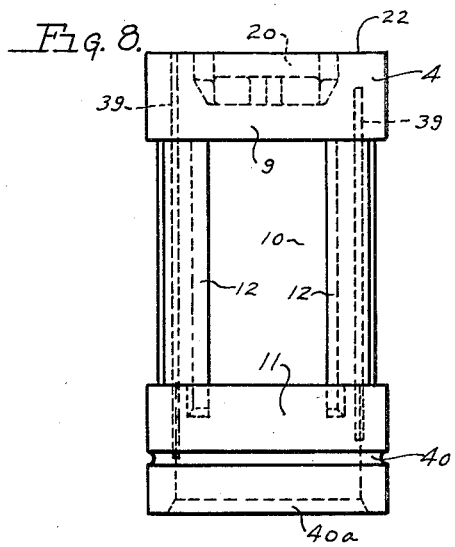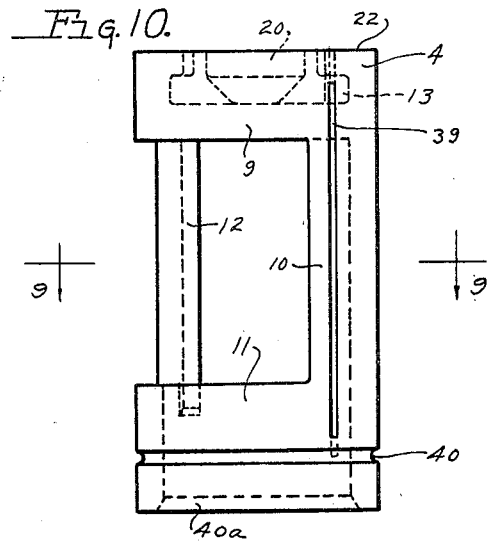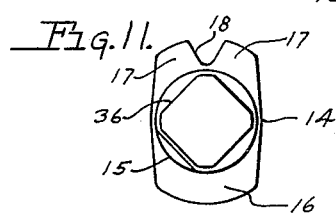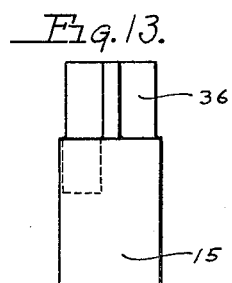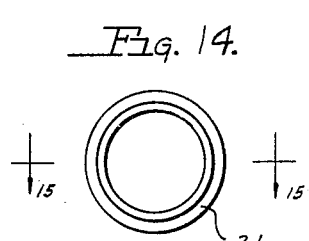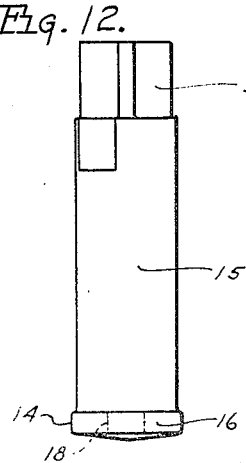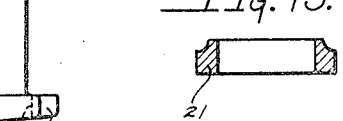

INVENTOR
Frederick H. Hehemann.
BY
Toulmin & Toulmin
ATTORNEY

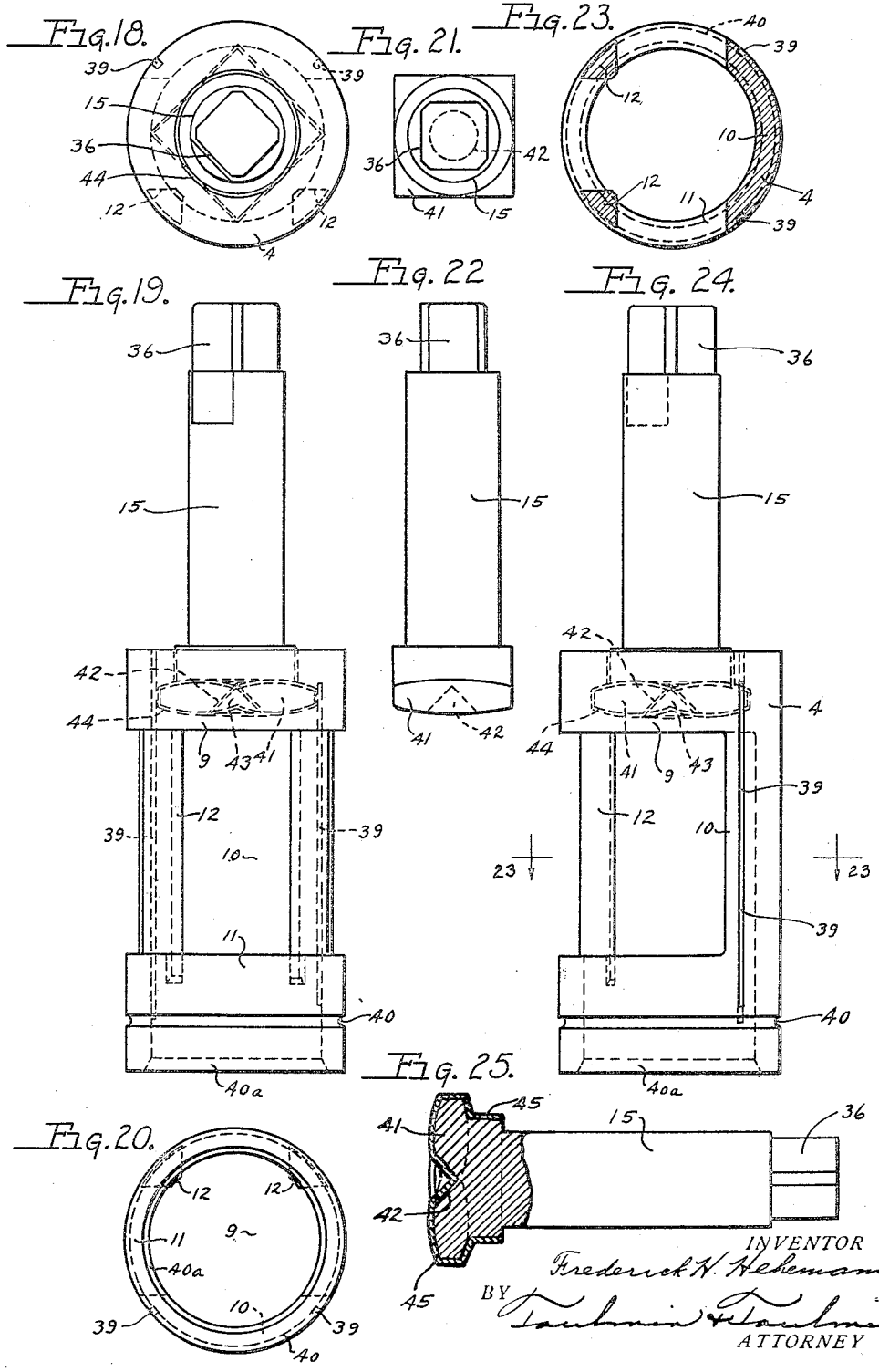

Patented June 20, 1933

1,914,719

UNITED STATES PATENT OFFICE

FREDERICK H. HEHEMANN, OF CINCINNATI, OHIO, ASSIGNOR TO THE LUNKENHEIMER COMPANY, OF CINCINNATI, OHIO, A CORPORATION OF OHIO

LOOSE STEM ROTOR AND LUBRICATED VALVE

Application filed June 23, 1930. Serial No. 463,021.

My invention relates to lubricated valves.

It is the object of my invention to provide a lubricated valve in which the rotor has a detachable stem.

It is a further object to provide a stem of relatively hard material capable of taking abuse from operating tools and the rotor of easily machinable softer material.

It is a further object to provide an economy in production by producing the valve stem and rotor separately and provide a ready means for assembly or disassembly. When in assembled condition they will rotate together.

It is a further object to provide a method of separately producing a valve stem and then producing a combined valve stem and rotor permanently connected but loosely joined to one another in order to provide for relative movement between the rotor and the stem while insuring rotation together.

It is a further object to provide a method of production of the relatively movable stem and rotor of different materials but permanently attached to one another.

It is an object to provide a stem that is stationary against lateral movement and a freely movable rotor body with respect to the stem in its lateral movement so that the rotor can find its seat or remain on its seat without interference by reason of the position of the stem.

It is a further object to provide the interlocking of the stem and rotor so that they can be assembled only in one way.

Referring to the drawings, Figure 1 is a vertical section through a valve showing the rotor and the detachable loosely mounted stem in operative position with the valve closed.

Figure 2 shows a diagrammatic view of one end of the stem and the receiving end of the rotor in section with the stem being introduced into the rotor.

Figure 3 shows the next step where the rotor is introduced.

Figure 4 shows the degree of lateral movement possible in one direction by the rotor and stem.

Figure 5 shows the retaining ring pressed into position.

Figure 6 is a section on the line 6—6 of Figure 1.

Figure 7 is a top plan view of the rotor with the stem removed.

Figure 8 is a side elevation thereof showing the ends of the connecting walls of the rotor.

Figure 9 is a section on the line 9—9 of Figure 10.

Figure 10 is a side elevation of the rotor.

Figure 11 is a top plan view of the stem.

Figure 12 is a side elevation thereof.

Figure 13 is a side elevation thereof.

Figure 14 is a plan view of the detachable filler collar used on the stem.

Figure 15 is a section on the line 15—15 of Figure 14.

Figure 18 is a top plan view of the rotor and stem.

Figure 19 is a side elevation thereof.

Figure 20 is a bottom plan view thereof.

Figure 21 is a top plan view of the stem detached from the rotor.

Figure 22 is a side elevation of the stem detached from the rotor.

Figure 23 is a section on the line 23—23 of Figure 24.

Figure 24 is a side elevation of the stem in position with the rotor.

Figure 25 is a side elevation partially in section showing the asbestos cover of the valve stem prior to its insertion within the mold for the casting of the rotor about the stem.

Figure 16:
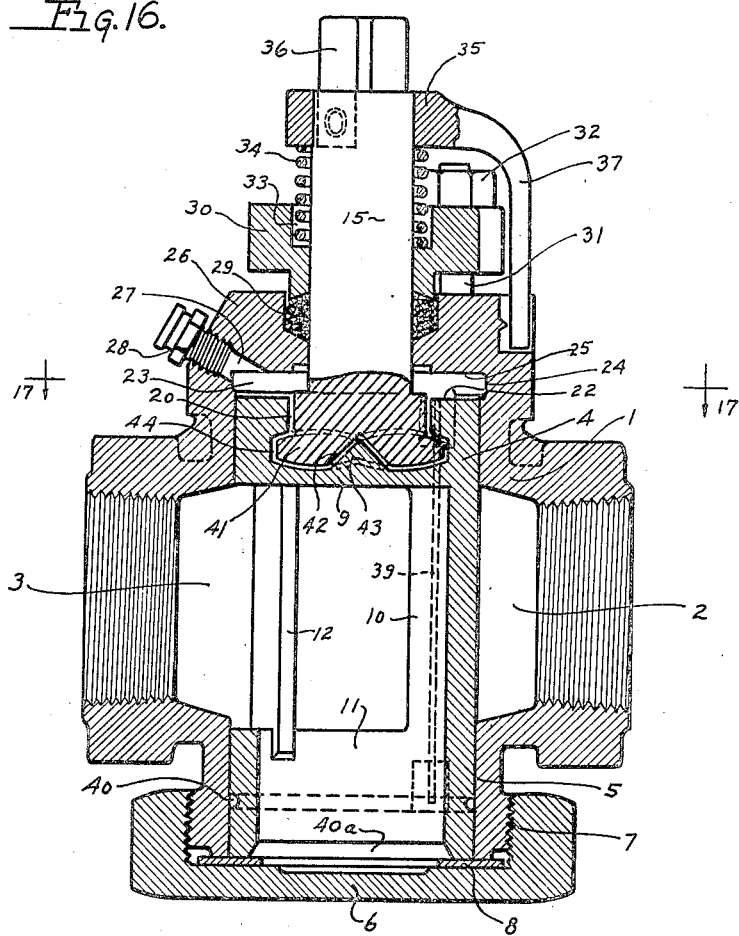
Figure 16 is a vertical section through a modified form of the valve showing the permanent connection between a rotor and its loose stem.

Referring to the drawings in detail, 1 designates the valve casing which has a passageway 2 on one side and a passageway 3 on the other, the juncture of such passageways being controlled by a rotor designated 4. The rotor is inserted into the rotor chamber 5 through the bottom of the casing 1 which is normally closed by the screw threaded cap 6 threaded on the casing at 7 and sealed thereto by the gasket 8. The rotor comprises a top member 9, a closed wall arcuate in section designated 10 and a ring 11 mounted within the lower portion of the chamber 5 in the casing for receiving the rotor. Spaced vertical connecting ribs 12 connect the top 9 and the ring 11 at intervals. The wall 10 serves as a closure between the passageways 2 and 3. The top of the rotor is provided with a large chamber 13 for receiving the oblong head 14 on the valve stem 15. This head has an arcuate end 16 projecting at one end and a notched arcuate end 17 having a notch 18 projecting at the other end, thereby forming a pair of jaws on that end. These jaws embrace a wedge shaped projection 19 that projects into the interior of the chamber 13.

The chamber 13 is of greater size and of materially greater length than the oblong opening 20 through which the head 14 is received. The length of the chamber 13 is greater than the over-all length of the head 14 so that when the projection 16 or the projection 17 is touching one of the end walls 20a of the chamber 14, the other end of the head is not touching the other wall. This provides for relative movement laterally between the rotor 4 and its stem 15 while still maintaining the engagement of the projection 19 and jaws 17 to the assembly of the two parts together in the correct position.

After the head is inserted as in Figure 2 the collar 21 which is slidably mounted upon the stem 15 may be dropped into position to further align and position the stem with respect to the rotor.

The upper surface 22 of the rotor head 9 forms a lower wall of a lubricant chamber 23, the side and top walls of which as at 24 and 25 are formed by the top of the casing 26. Lubricant is supplied through a passageway 27 to this chamber when a screw plug 28 is removed or through a check valve.

The valve stem 15 extends out through the cover 26 of the casing which contains the packing 29. This packing is retained in position by the packing nut 30 that is in turn held in position by the bolts 31 and nuts 32, the bolts being mounted upon the casing top 26. In a recess 33 in this packing nut 30 is mounted a helical spring 34 surrounding the valve stem and engaging at its top a collar 35 which is fastened to the valve stem below the angular head 36 of the valve stem. This collar 35 carries a depending finger 37 that is inserted into an arcuate slot 38 cut in the side wall of the casing 26. This finger indicates the degree of rotation of the stem and its rotor and the quantity of lubricant in the lubricant chamber 23.

This rotor is provided with vertical grooves 39 for distributing lubricant and a circular groove 40 which surrounds the bottom ring 11 of the rotor. It will be noted that the bottom of the rotor is open at 40a on the interior so that the only parts upon which line pressure will operate will be the bottom of the top 9 and the bottom of the side walls of the rotor. The rotor is unbalanced because the line pressure acts on the area of the rotor and this area is greater than the area of the lubricant chamber. The area of the lubricant chamber is reduced by the area of the stem which passes through the lubricant chamber and the casing to the outside of the casing. Consequently the pressure on the lubricant is greater than the line pressure and the lubricant is forced by the movement of the rotor between the rotor and the casing. The result of this is to remove the rotor and squeeze lubricant through the passageways 39 and 40. Any lateral movement of the rotor with respect to the stem is accommodated by the loose connection while the interlocking of the jaws 17 and projection 19 insure the rotation and alignment in proper position of the stem and rotor.

Figure 17:
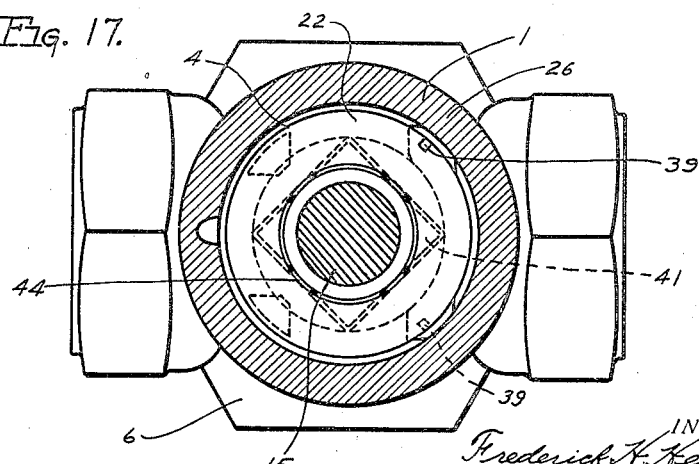
Figure 17 is a section on the line 17—17 of Figure 16.

Referring to the modification shown in Figures 16 to 25, where I have provided a rotor and stem of separate parts permanently connected but loosely fitting with respect to one another, it will be understood that this valve stem may be of turned or forged steel to accommodate the wear due to the application of tools for moving the valve, while the rotor may be of cast iron or of non-corrosive material, the stem being protected by the rotor and the lubricant in the lubricant chamber from the effects of the corrosive gas or liquid in the line. This loose connection between the stem and rotor provides for differences in co-efficient of expansion and for relative adjustment between the stem which is tightly held against lateral movement and the rotor, which may be moved laterally due to the pressures and temperatures to which it is subjected.

In this instance the stem 15 is provided with a square head 41, the under side of which is provided with a transverse cone-shaped groove 42 to receive a transverse cone-shaped projection 43 that extends up from the bottom of the square receiving chamber 44.

In practise I have found that if I first provide the valve stem 15 and then encase its head 41 with a layer of material such as asbestos 45, I can then cast the rotor around the head, the asbestos will disappear during the process of casting or can be shaken out afterwards, and I will then have a loose fit between the stem and the head but it will be impossible to detach the stem from the head.

It will be understood that I desire to comprehend within my invention such modifications as may be necessary to adapt it to varying conditions and uses.

Having thus fully described my invention, what I claim as new and desire to secure by Letters Patent, is:

1. In a valve, a valve casing, a rotor therein, a valve stem loosely mounted in said rotor and detachable therefrom, and means to cause said rotor and stem to turn together, said stem having loosely mounted thereon means when in operative position to engage with the rotor to prevent detachment of the rotor from the stem, and yielding means to move said rotor and stem vertically.

2. In a valve, a valve casing, a rotor therein, a valve stem loosely mounted in said rotor and detachable therefrom, and means to cause said rotor and stem to turn together, said stem when in operative position having means thereon engaging with the rotor to prevent detachment of the rotor from the stem, while the major axes of said rotor and stem are in alignment or parallel to one another, and yielding means to move said rotor and stem vertically.

3. In a valve, a casing, a rotor and a detachable stem having a head adapted to be inserted into said rotor, said rotor having a head receiving chamber with a restricted throat whereby said head must be inserted into said chamber with the stem in angular position.

4. In a valve, a casing, a rotor and a detachable stem having a head adapted to be inserted into said rotor, said rotor having a head receiving chamber with a restricted throat whereby said head must be inserted into said chamber with the stem in angular position, said head in said chamber having an angular shape, said chamber being longer in one direction than the corresponding dimension of the head.

5. In a valve, a casing, a rotor and a detachable stem having a head adapted to be inserted into said rotor, said rotor having a head receiving chamber with a restricted throat whereby said head must be inserted into said chamber with the stem in angular position, said head in said chamber having an angular shape, said chamber being longer in one direction than the corresponding dimension of the head, and means projecting from said chamber insertable in a portion of said head adapted to cause said head and rotor to travel together in rotation.

6. In a valve, a casing, a rotor and a detachable stem having a head adapted to be inserted into said rotor, said rotor having a head receiving chamber with a restricted throat whereby said head must be inserted into said chamber with the stem in angular position, said head in said chamber having an angular shape, said chamber being longer in one direction than the corresponding dimension of the head, and means projecting from said chamber insertable in a portion of said head adapted to cause said head and rotor to travel together in rotation, and a slidable collar on said stem supported by said head and insertable within said chamber.

7. In a lubricated valve, a casing, an unbalanced rotor therein, a detachable stem mounted in said rotor non-detachable when the major axis of the rotor and stem coincide or are parallel with one another, means to cause said stem and rotor to rotate with one another, said rotor and casing forming a lubricant chamber, and means for conveying lubricant therefrom between the casing and the rotor.

8. In a lubricated valve, a casing, a rotor therein having an oblong slot with arcuate side walls, a stem having an oblong head insertable therein, and a filler ring mounted on said stem projecting into the arcuate portions of said slot and a part of the oblong portions thereof.

9. In a valve, a casing, a rotor therein having a recess in the top thereof with a restricted throat, said recess being oblong and said throat having arcuate side walls, a stem having an oblong head insertable in said recess and a slidable ring on said stem adapted to fit within said throat on said head.

10. In a valve, a casing, a rotor therein having a recess in the top thereof with a restricted throat, said recess being oblong and said throat having arcuate side walls, a stem having an oblong head insertable in said recess and a slidable ring on said stem adapted to fit within said throat on said head, and means on said head and in said recess to relatively align said head and said rotor.

In testimony whereof, I affix my signature.

FREDERICK H. HEHEMANN.